United States Patent

[11] 3,629,945

| [72] | Inventors | John C. Liuzzo;<br>Helmut Welker, both of Jamestown, N.Y. |
|------|-----------|---|
| [21] | Appl. No. | 863,882 |
| [22] | Filed | Oct. 6, 1969 |
| [45] | Patented | Dec. 28, 1971 |
| [73] | Assignee | Bausch & Lomb Incorporated<br>Rochester, N.Y. |

[54] OPTICAL GAGE
9 Claims, 7 Drawing Figs.

[52] U.S. Cl. .................................................. 33/107 R,
33/125 A, 350/116
[51] Int. Cl. ................................................... G01d 3/04
[50] Field of Search .......................................... 350/114,
115, 116, 110–112; 356/171; 33/46, 1, 107, 111, 125

[56] References Cited
UNITED STATES PATENTS

| 2,143,241 | 1/1939 | Hallenbeck ................. | 33/125 Q |
| 2,237,515 | 4/1941 | Williams ...................... | 33/125 Q |
| 2,915,826 | 12/1959 | Bruscaglioni ................. | 33/46 |
| 3,163,940 | 1/1965 | Geiser .......................... | 350/116 X |
| 3,287,810 | 11/1966 | Heidenhain .................. | 33/125 |
| 3,487,547 | 1/1970 | Brown .......................... | 33/75 X |

FOREIGN PATENTS

| 328,475 | 4/1958 | Switzerland ................. | 33/125 Q |

*Primary Examiner*—Harry N. Haroian
*Attorneys*—Frank C. Parker and Bernard D. Bogdon ABSTRACT: A gage for linear measurement of a workpiece comprises an optical assembly for viewing a linear scale placed for reading upon the workpiece, both the scale and the observed portion of the workpiece being at the same focal length. The optical assembly is slidable either by manual operation or by a control mechanism including a control shaft having spiral grooves which which are diminutive in depth which journal within, for example a thermoplastic bushing housed by the optical assembly. Rotation of the control shaft about its axis causes the optical assembly to traverse along the length of the scale. The optical assembly is also slidably translatable.

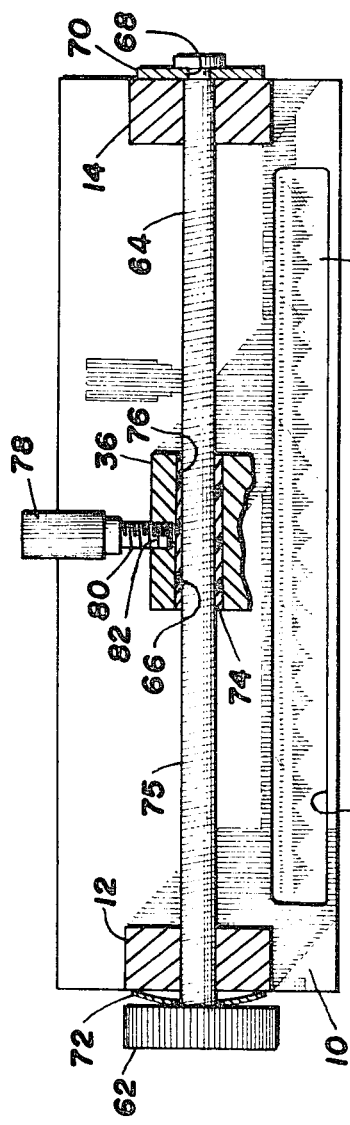
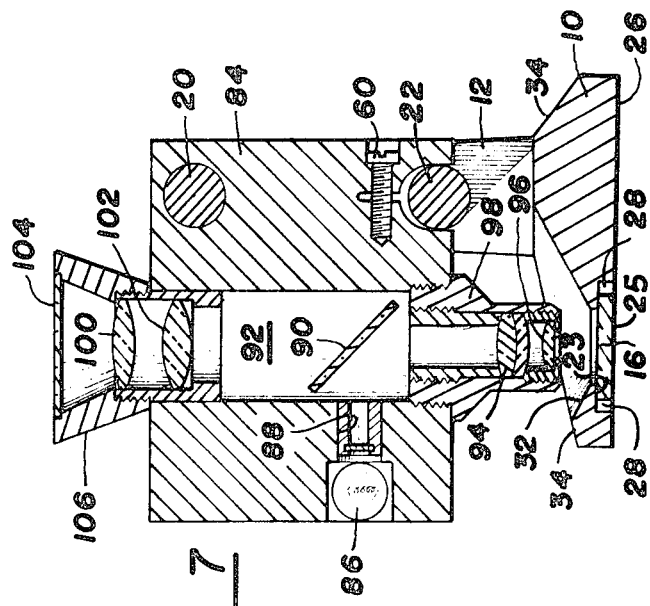
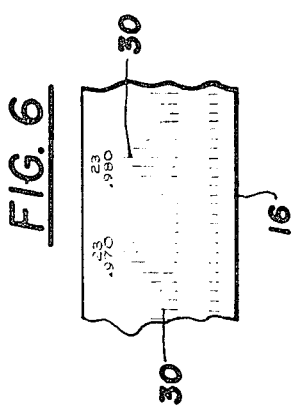
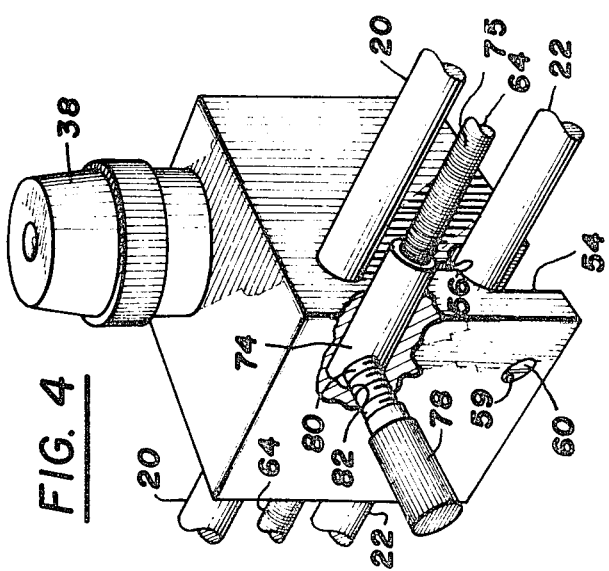
JOHN C. LIUZZO
HELMUT WELKER
INVENTORS
BY
BERNARD D. BOGDON
ATTORNEY

JOHN C. LIUZZO
HELMUT WELKER
INVENTORS

BY
BERNARD D. BOGDON
ATTORNEY

OPTICAL GAGE

BACKGROUND OF THE INVENTION

1. Field of the Invention

This invention relates to an instrument for making linear measurements and more particularly to an optical gage having a scale which can be placed for reading directly upon the workpiece being studied and a movable optical assembly for viewing the scale.

2. Description of the Prior Art

In the past instruments for measuring workpieces, such as, machined parts, have for the most part had the readout sales remote from the workpiece being measured. Instruments of this type necessitate that extreme care be taken in aligning the instrument with the workpiece which is frequently remotely located on a mobile machine table from the readout scale with the measuring portion of the instrument. The extra operation of alignment is both tedious and time consuming.

Instruments for direct reading and not having remotely located portions, generally include in combination, a viewing device and a readout scale which is placed directly over the workpiece being observed. These are frequently difficult to read accurately because of the parallax phenomenon which exists because of the spacing between the scale and measuring point on the workpiece. Quite frequently combination devices as described are not usable with medium or high-powered optics since it is difficult to adequately illuminate the area being observed due to structural elements interfering with the passage of light to that area.

SUMMARY OF THE INVENTION

Accordingly, the disclosed invention is provided to meet the needs for a measuring device which is not subject to scale parallax reading discrepancies, is structurally oriented to permit the maximum amount of ambient light to illuminate the scale, and is operationally controllable in order that scale readings can be taken easily, regularly and accurately.

To this end a glass scale having metal wear-resistant graduation markings is mounted for independent thermal expansion and contraction, to a base carrying an optical assembly supported by parallel extending slide bars supported by base end posts and disposed so as not to interfere with ambient or artificial illumination at the scale. The device provides for ease of operation and is slidable from any position upon application of a lateral force.

A modification of the device provides a control comprising a control shaft having spirally formed grooves about its peripheral surface for engaging a substantially uniform material having thermoplastic properties carried by the optical assembly to thereby provide for rectilinear movement of the assembly at such times as the shaft is rotated.

BRIEF DESCRIPTION OF THE DRAWINGS

FIG. 4 is a fragmentary perspective view of the optical assembly illustrated in FIG. 3;

FIG. 5 is a sectional plan view through FIG. 3 on the plane of line 5—5;

FIG. 6 is a fragmentary enlarged plan view of the scale of the gage illustrated in FIG. 5; and FIG. 7 is a longitudinal sectional view of a microprojector included with a modification of the gage illustrated in FIG. 1.

DETAILED DESCRIPTION OF THE PREFERRED EMBODIMENTS

Figure 1:
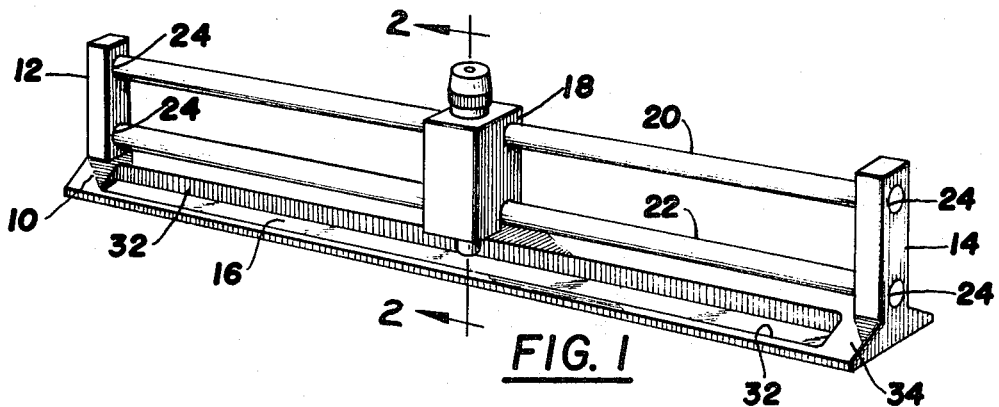
FIG. 1 is a perspective view of a gage including an optical assembly constructed in accordance with the principles of the present invention.

In FIG. 1, a longitudinal extending base 10 having integral transversely disposed end posts 12 and 14 at its respective ends, carries a scale 16 for viewing by an optical assembly 18 slidably carried by support rods 20 and 22. Support rods 20 and 22 are preferably cylindrically shaped and are spaced apart, extending parallel to the base 10 and the scale 16 between end posts 12 and 14. The base 10, end posts 12 and 14 and support rods 20 and 22 are preferably formed of a rigid and machinable material as, for example, anodized aluminum or stainless steel. Support rods 20 and 22 have their respective ends affixed to end posts 12 and 14, engaging the upright and posts 12 and 14 at apertures 24 extending laterally therethrough.

The scale 16 is transparent, preferably formed of glass, and generally rectangular having a thickness suitable for providing strength. The scale 16 is carried by base 10 in an accommodating rectangular recess 23 to provide direct contact with a workpiece upon which the scale 16 is placed for reading. To this end the bottom surface 25 of the scale 16 which rests upon the workpiece is flat and forms a continuous plane with the bottom surface 26 of the base 10, as best seen in FIG. 7. The scale 16 is carried by the base 10 to expand and contract in response to thermal changes, independent of the expansion and contraction of the material of the base 10. Accordingly, the scale 16 is affixed to the base 10 by means of a suitable adhesive or filler material, for example, one having an epoxy resin or a silicone rubber base, disposed about the scale 16 in the recess 23 and generally filling the space 28 between the lateral sides of the scale 16 and those of the recess 23, as best seen in FIG. 7.

For viewing the marks 30 on the scale bottom surface 25 through the transparent scale 16, an elongated aperture 32 extends from the top surface 34 of the base 10 through the base 10 to the bottom of the recess 23.

FIG. 5, a plan view, best shows the continual sawtooth pattern formed by groupings of different length individual graduation marks 30 on the scale 16. FIG. 6 is an enlarged view of a portion of the scale 16 shown in FIG. 5, and illustrates two full groups each comprising ten stepped graduation marks 30 to form one sawtooth. The points of the formed sawtooths are arbitrarily identified by linear readings 23.970 and 23.980 respectively.

The graduation marks 30 on the bottom surface 25 of the scale 16 are wear resistant and are formed by a vacuum deposit process. Processes to perform vacuum deposition are known in the art one of which is hereinafter generally described. The bottom surface 25 of the scale 16 is totally covered by vacuum deposited chrome or a like material. A photoresist material is then applied over the chrome surface. A master scale is subsequently placed over the coated surface of the chrome, thereby covering a portion of the photoresist at areas to define the graduation marks. The uncovered photoresist is then exposed. The exposed photoresist is removed by photographic development and the remaining photoresist is baked to a hardened state. The areas of uncoated chrome are etched leaving a pattern of the scale defined on the glass. The baked photoresist is then removed from the chrome by a suitable material such as acetone. This method of forming a scale can provide a scale of 1000 marks per inch.

Figure 2:
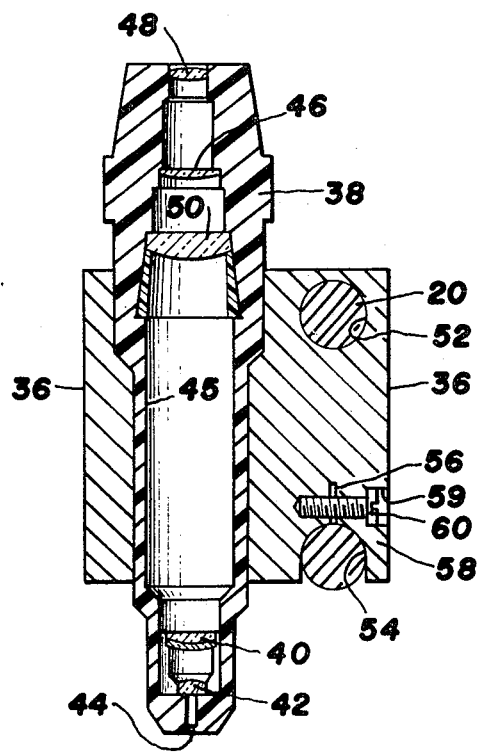
FIG. 2 is a longitudinal sectional view through the micro-objective lens system of the optical assembly along the plane of line 2—2 of in FIG. 1.

The optical assembly 18 for viewing the scale 16 comprises a mounting block 36 for carrying, for example, a micro-objective lens system housed in a body tube 38, as best shown in FIG. 2. The body tube 38 is preferably affixed to the mounting block 36 and is disposed above the scale 16 to provide a fixed focus system. However, it is easily appreciated that the engagement between the body tube 38 and the mounting block 36 can be modified to include a focusing means for the optical assembly 18.

A micro-objective lens system comprising a doublet lens 40 and a singlet lens 42 are disposed above a field aperture 44 and are affixed to the body tube 38 at the end closest to the workpiece. The body tube 38 forms an inner chamber 45 through which electromagnetic radiation traverses communicating between the viewing end and the field aperture 44. The viewing end of the body tube 38 carries a scale plate 46 at which the image appears disposed between an eyepiece lens system comprising eyepiece lens 48 and 50. A single line or crosshair reticle is provided for viewing on the scale plate 46. As will be appreciated, the optical elements are formed of suitable optical materials in keeping with predetermined manufacturing cost considerations and the body tube is formed of a phenolic or like material which has the thermosetting properties.

The mounting block 36 is formed of a suitable light weight machinable material, such as anodized aluminum and includes an aperture 52 through which support rod 20 traverses and a vertical aligned inverted U-shaped cutout 54 through which the support rod 22 traverses. The vertically structured support rods 20 and 22 are disposed to one side of the body tube 38 to thereby permit artificial and ambient illumination to pass unobstructedly to the scale 16 and through to the workpiece being viewed.

Support rods 20 and 22 journal within the provided openings in the laterally mounting block 36 to provide ease of operation in sliding the optical assembly 18 along the support rods 20 and 22. It will be appreciated that bushings may be provided for wear and other operational considerations. A tension control is provided at support rod 22 by means of an elongated cutout 56 vertically aligned with the axes of the support rods 20 and 22 and communicating with the base portion of the inverted U-shaped cutout 54. The aligned cutouts 54 and 56 provide an appendage 58, a part of the mounting block 36, which is movable toward and away from the support rod 22 by means of a set screw 60 traversing through an aperture 59 in appendage 58, the elongated cutout portion 56 and threadably engaged with the mounting block 36. Adjustment of the set screw 60 causes the appendage 58 at its inner surface defined by an area of the U-shaped cutout portion 54, to exert a pressure against the outer surface of the support rod 22. The exerted pressure can be relieved by the reverse motion of the set screw 60. The tension is preferably adjusted to prevent inadvertent movement of the optical assembly at a level that permits hand operation without undue difficulty.

The gage illustrated in FIG. 1 is operated by sliding the optical assembly 18 along the path defined by support rods 20 and 22. This operation can be achieved manually or by other suitable mechanical means. It will be appreciated that in operation the gage is placed over the selected area on the workpiece and that the optical assembly 18 is slid to a point of reference for measuring. The optical assembly 18 is then traversed to a second point where a second reading is taken. Without undue detailed explanation the two readings are than interpreted, such as, by subtracting them in order to determine the measurement between the reference point and the second point. Accordingly, this invention provides a highly accurate and convenient to use gage.

Figure 3:
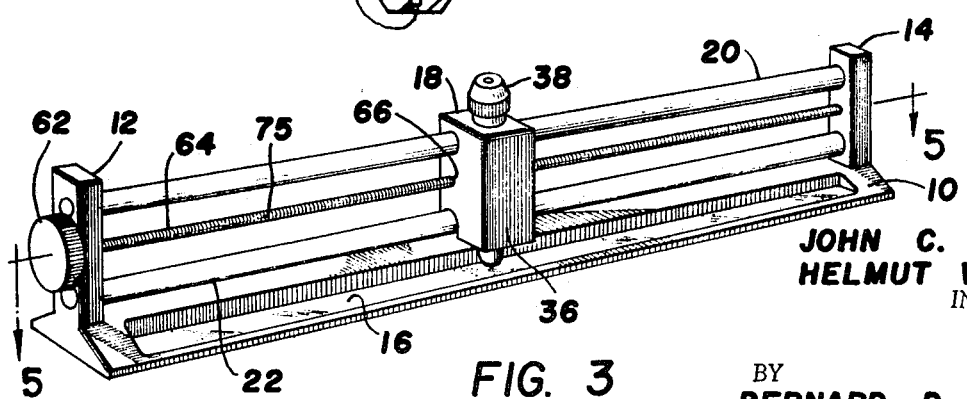
FIG. 3 is a perspective view of another gage including a rotary control constructed in accordance with the principles of the present invention.

The gage illustrated in FIG. 3 is similar to the gage illustrated in FIG. 1, but further includes a rotary control device for obtaining fine adjustment of the optical assembly 18, at a reading point. A control knob 62, disposed, for example, on the side of end post 12, engages a cylindrical rotary shaft 64 which extends between end posts 12 and 14 and journals within the mounting block 36 through an aperture 66, therein. The cylindrical rotary shaft 64 extends through the end support 14 and engages at a cutout 68 in the shaft 64 a retainer 70. The retainer 70 fits within the cutout 68 and positively locates one end of the rotary shaft 64. The opposite end of the rotary shaft 64 is affixed to the knob 62. A Belleville type spring washer 72 bears against the underside of the knob 62 and the side of end support 12 away from the optical assembly 18, to tension the control shaft 64 and to maintain the retainer 70 against the side of the end post 14 away from the optical assembly 18.

A bushing 74 affixed to the mounting block 36, encompasses that portion of the rotary shaft 64 which extends through the aperture 66 in the mounting block 36, as best seen in FIGS. 4 and 5. The rotary shaft 64 is provided with an extremely fine spirally formed groove 75 or grooves 75. The grooves are provided, for example, by turning upon a lathe with an appropriate cutting tool or by surfacing the cylindrical area of the rotary shaft 64 with a fine grit emery cloth. The grooves formed are, for example, less than 0.005 inches deep and are spaced, for example, approximately 0.010 inches apart. The grooves need not be continuous, but can be broken or interrupted and, for example, are pitched to comprise 10 turns per inch.

The bushing 74 is formed of thermoplastic material having a low coefficient of friction, such as Teflon, nylon, or Delrin. A cylindrical bore 76 extending through the bushing 74 is closely toleranced to frictionally engage the peripheral cylindrical surface of the rotary shaft 64. The inner surface of the bushing 74, defining the bore 76, is uniform within manufacturing tolerances and the bushing 74 is formed for example by an extrusion process.

In operation, the control knob 62 is rotated to cause the mounting block 36 to laterally traverse between the end posts 12 and 14 being carried by support rods 20 and 22. The spirally formed grooves 75 and the uniform inner surface of the bushing 74 engage to convert the rotatory motion of the shaft 64 into translatory motion for the mounting block 36. The close "glove type fit" between the inner surface of the bushing 74 formed of, for example, one of the hereinbefore mentioned selected materials and the rotary shaft 64 makes the inner surface, engaging the crest surfaces of the grooves 75 for all practical purposes self-threaded to traverse laterally when the control knob 62 is rotated without experiencing backlash. This fine adjustment control provides for reading accuracies to 0.0002 inches.

Engagement contact between the bushing 74 and the grooves 75 on the rotary shaft 64 is such that the optical assembly 18 can be moved laterally by an application of an externally applied manual force or the like, as hereinbefore described with reference to the optical assembly 18 in FIG. 1.

To control the engagement contact between the inner surface of the bushing 74 and the peripheral surface of the rotary shaft 64, a thumb knob 78 is provided. The thumb knob 78 has a knurled outer surface at one end for positive gripping for manual operation and a stud 80 at the opposite end threadably engaged with the mounting block 36 at aperture 82, as best shown in FIGS. 4 and 5. As desired the thumb knob 78 may be rotated to increase or decrease the pressure exerted by the deformable material of the bushing 74 on the grooved surface of the rotary shaft 64. Proper adjustment of the thumb knob 78 provides for the convenience of laterally sliding the optical assembly 18, as hereinbefore mentioned by applying a force. Although translatory movement of the mounting block 36 can be provided at any one setting of the thumb knob 78, either by rotary actuation of the control knob 62 or by the application of a force applied to an exterior lateral side of the mounting block 36, it is preferred that before a lateral force is applied that the thumb knob 78 be turned to relieve the contact pressure between the bushing 74 and the rotary shaft 64 in order to preclude undue wear to the inner surface of the bushing 74.

In FIG. 7 a microprojector mounting block 84 similarly constructed to the mounting block 36 and similarly engaging support rods 20 and 22 is illustrated, providing a system which displays the workpiece and scale for convenient viewing. A lamp 86 is carried by the block 84 for producing electromagnetic radiation for passage through an opening 88 to a beam splitter 90 disposed within an inner chamber 92 defined by the projector mounting block 84. The projector is constructed according to the principles known to those skilled in the art and comprises a micro-objective lens system comprising a doublet lens 94 and a singlet lens 96 housed in an optical cell 98, affixed to the mounting block 84 and disposed near the workpiece being viewed. The beam splitter 90 provides direct illumination to eyepiece lens 100 and 012 for providing an image on a viewing screen 104. The eyepiece lenses 100 and 102 and the viewing screen 104 are affixed in an optical cell 106 disposed above the top surface of the projector mounting block 84.

Thusly described is the invention by way of illustrative examples of practical embodiments.

We claim:

1. An instrument for measuring a workpiece, comprising:
a base;
a measuring scale carried by said base, said scale disposed for contacting the workpiece; and
an optical assembly disposed for viewing the scale and carried by said base, the optical assembly slidably engaging a shaft carried by said base, said shaft being rotatably carried by said base and engaging said optical assembly to cause said assembly to move in a plane parallel to the scale when said shaft is rotated, said shaft being spirally grooved and engaging a uniformly formed surface of a bushing carried within said optical assembly.

2. The instrument as defined in claim 1, wherein the groove is of diminutive depth.

3. The instrument as defined in claim 1 wherein the shaft has a plurality of grooves and said grooves are formed by abrading the shaft surface with a fine grit abrasive sheet material.

4. The instrument as defined in claim 2, wherein engagement between the uniform surface and the shaft comprises the uniform surface engaging the groove and the juxtaposed cylindrical surface.

5. The instrument as defined in claim 4, wherein the uniform surface is formed of thermoplastic material.

6. An instrument for measuring a workpiece, comprising:
a base having two integral spaced apart supports extending transversely therefrom;
a measuring scale carried by said base and supported to expand and contract independently of said base;
a support shaft disposed parallel to said scale, said shaft carried by said supports;
an optical assembly disposed for viewing the scale and slidably carried by the support shaft; and
a control shaft disposed parallel to said scale, said control shaft rotatably carried by said support being spirally grooved and rotatably engaging a substantially uniform surface of a bushing affixed to said optical assembly, said assembly being caused to move in a plane parallel to the scale when said control shaft is rotated.

7. The instrument as defined in claim 6, wherein the support and control shafts are disposed on one side of an imaginary plane, formed by the scale and the optical axis of the optical assembly, extending transversely thereto, to thereby permit ambient light to transverse unobstructively to illuminate the scale.

8. A measuring instrument, comprising:
a. a scale having marks formed on a transparent member, said scale being adapted to be brought substantially in contact with an object to be measured;
b. optical apparatus adapted to form an image of a portion of said marks;
c. guide means connected to said scale and having a guiding surface substantially equidistant therefrom;
d. mounting means for said optical apparatus having means cooperative with said guide means for holding said optical apparatus in proper position for forming an image of said marks on said scale; and
e. rotatory means cooperative with said mounting means for imparting motion to said optical apparatus along said guide means, said rotatory means and said mounting means each comprising an interfacing member cooperative with the other, one of said interfacing members having a smooth, uniform resilient surface, and the other having a nonresilient surface with fine, slanted grooves formed therein.

9. The measuring instrument of claim 8, further comprising means for urging said members together.

* * * * *